(12) United States Patent
Viswesh

(10) Patent No.: US 10,398,965 B2
(45) Date of Patent: Sep. 3, 2019

(54) METHOD AND APPARATUS FOR LOCATING 3-D OBJECTS AND EXECUTING DESIRED OPERATION, SUCH AS PLAYING CAROM, BY ROBOT

(71) Applicant: Srinivasan Viswesh, Bangalore (IN)

(72) Inventor: Srinivasan Viswesh, Bangalore (IN)

( * ) Notice: Subject to any disclaimer, the term of this patent is extended or adjusted under 35 U.S.C. 154(b) by 407 days.

(21) Appl. No.: 15/523,316

(22) PCT Filed: Jun. 27, 2013

(86) PCT No.: PCT/IN2013/000393
§ 371 (c)(1),
(2) Date: Apr. 28, 2017

(87) PCT Pub. No.: WO2014/002116
PCT Pub. Date: Jan. 3, 2014

(65) Prior Publication Data
US 2017/0340952 A1    Nov. 30, 2017

(30) Foreign Application Priority Data
Jun. 27, 2012  (IN) ............................ 2558/CHE/2012

(51) Int. Cl.
*A63D 15/00* (2006.01)
*B25J 9/16* (2006.01)
(52) U.S. Cl.
CPC ............ *A63D 15/00* (2013.01); *B25J 9/1697* (2013.01); *A63B 2243/002* (2013.01); *G05B 2219/40293* (2013.01)
(58) Field of Classification Search
CPC .. A63D 15/00; B25J 9/1697; A63B 2243/002; G05B 2219/40293

USPC .................................................. 700/245, 259
See application file for complete search history.

(56) References Cited

U.S. PATENT DOCUMENTS

| 5,335,905 A | * | 8/1994 | Newgarden, Jr. | A63B 67/04 473/431 |
| 5,383,658 A | * | 1/1995 | Newgarden, Jr. | A63B 67/04 473/431 |
| 5,566,936 A | * | 10/1996 | Newgarden | A63B 63/007 473/431 |

(Continued)

FOREIGN PATENT DOCUMENTS

CA    2520923 A1 *    3/2006    ............ B25J 9/1697

OTHER PUBLICATIONS

Greenspan et al, Toward a Competitive Pool-Playing Robot, Jan. 1, 2008, IEEE, vol. 41, pp. 46-53 (Year: 2008).*

*Primary Examiner* — Jaime Figueroa

(57) ABSTRACT

An apparatus and a method to locate a three dimensional object and to execute a predetermined operation on said object, such as playing carom is disclosed. The apparatus includes a robot (200) having an end effector (202) mounted on a gantry frame. The apparatus further includes a plurality of imaging sensors mounted at predetermined positions in said gantry frame. A data processing system (computer) (214) is provided in communication with said robot (200) and said imaging sensors. Further a controller 216 connected to said data processing system (214) to regulate the functions of said data processing system. The end-effect or (202) provided in the robot (200) consists of at least two degrees of freedom, one for rotational (302) and other for transmitting force (306*a*).

10 Claims, 6 Drawing Sheets

(56) References Cited

U.S. PATENT DOCUMENTS

| | | | | |
|---|---|---|---|---|
| 7,733,050 B2* | 6/2010 | Prasanna | ............. | H02K 49/046 318/164 |
| 7,831,337 B2* | 11/2010 | Greenspan | ............. | B25J 9/1697 473/1 |
| 8,758,174 B2* | 6/2014 | Thoman | ............... | A63B 69/406 473/459 |
| 2006/0063599 A1* | 3/2006 | Greenspan | ............. | B25J 9/1697 473/1 |
| 2006/0261765 A1* | 11/2006 | Prasanna | ............. | H02K 49/046 318/400.01 |
| 2008/0211447 A1* | 9/2008 | Prasanna | ............. | H02K 49/046 318/701 |

* cited by examiner

METHOD AND APPARATUS FOR LOCATING 3-D OBJECTS AND EXECUTING DESIRED OPERATION, SUCH AS PLAYING CAROM, BY ROBOT

The present application is a National Phase Application for PCT application No. PCT/IN2013/000393 filed on 27 Jun. 2013 based on, and claims priority to Indian Application Number 2558/CHE/2012 filed on 27 Jun. 2012, the disclosure of which is hereby incorporated by reference.

FIELD OF INVENTION

The embodiments herein relate to a vision guided robot, more particularly but not exclusively to a method and apparatus to locate a three dimensional object on a surface and to execute a predetermined operation on the located object for example to play a game such as carom, pool game, billiard and snooker.

BACKGROUND OF INVENTION

At present, vision guided intelligent robotic systems are adapted to perform wide variety of challenging tasks which only a skilled human operator or player can perform. One popular application attempted by several researchers/Engineers is to build robots that can compete with a human player in the field of games/sports. Robots such as chess playing robots, ping-pong playing robots, pool/billiards playing robots, somersaulting robots, soccer playing robots and so on are the example of robots being used in games or sports. Such robots are usually used as practicing/training/playing/skill-testing partners by professional and amateur sports persons and organizations. Further, such robotics designs bring out the best of engineering and technology skills of the inventor and helps in the evolution of the technology. Technologies developed in such endeavors often find applications in various Industrial and real-life applications also, making the inventions all the more meaningful.

CAROM is one of the popular board game in the world. The objective of game is to use a striker disk with a flick of the finger to make contact with and move lighter and darker object disks, which are thus propelled into corner pockets. The game allows maximum of four players to play the game at a time and get entertained. A human player playing the carom game requires sharp eyes, steady hands, good hand-eye coordination skills, ability to make intelligent shot selection, ability to think ahead/think into the future and so in order to succeed in this game. While adopting vision guided intelligent robotic systems in to the game of carom, organizing all these features/skills into a robot system at an economical cost is a very big challenge. Hence there is a need to develop smart methods and apparatus to bring down the complexity of the system and at the same time to make the system more intelligent & accurate.

Further, at present, there is no well documented attempt at building a CAROM playing robot. Although, there have been a few attempts in the field of Pool/Billiards Playing robots, the conventional Pool/Billiards Playing robots are not as efficient as desired when it comes to playing the game of carom. In conventional robots, the degree of freedom of various elements is not suitable for playing carom. For instance, the degree of freedom of an end-effect or in conventional robot is limited only to striking, whereas the game of carom requires the robot to strike the striker from different angle. Furthermore, global camera used in conventional robots for obtaining image of the billiard board, is installed such that "the global camera is looking down on the table and the camera's image plane is substantially parallel to the playing surface".

This configuration poses severe limitations in terms of visibility of the entire board to the global camera. The global cameras view is often likely to be blocked by the gantry and end-effect or system of the robot. Further, this requires the gantry to be repositioned to one extreme side of the table after each shot, in order to obtain a clear view of the board.

Further, in conventional robots, a local camera's image plane is parallel to the cue axis. This again presents complications in terms of camera mounting and calibration of the system.

Therefore, there is a need for a method and apparatus for providing a carom playing robot that could reduce the system complexity and the cost at the same time maintaining the desired accuracy. Further, there is need for a system and method for providing a carom playing robot that could obviate above mentioned drawbacks of existing robots.

SUMMARY

Accordingly an apparatus to locate a three dimensional object and to execute a predetermined operation on said located object, such as playing carom, is disclosed. The apparatus includes a robot having an end effect or mounted on a gantry frame. The apparatus further includes a plurality of imaging sensors mounted at predetermined positions in said gantry frame. A data processing system (computer) is provided in communication with said robot and said imaging sensors. Further a controller connected to said data processing system. The end effect or provided with the robot consists of at least two degrees of freedom, one for rotational and other for transmitting force.

Also, a method for locating a three dimensional object and to execute a predetermined operation on said located object, such as playing carom, is provided. The method includes providing a robot having an end effect or mounted on a gantry frame. The method further includes installing a plurality of imaging sensors at predetermined locations to capture at least one image of said object. Further the method includes a step of calibrating said image sensor. In addition, the method includes providing a data processing system (computer) to receive information from said imaging sensors and to execute a predetermined operation. Furthermore, the method includes connecting a controller to regulate functions of said robot.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
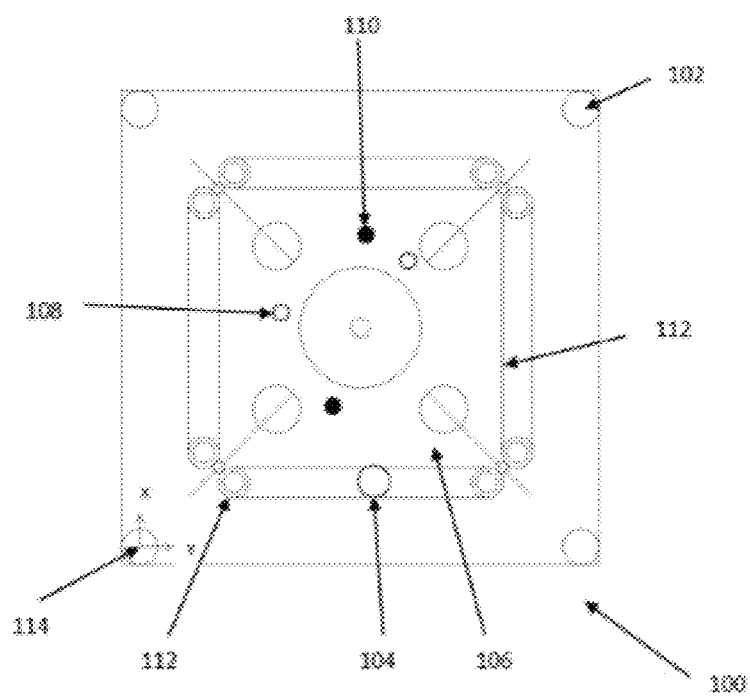
FIG. 1 depicts a typical carom board on which the computer controller robot could be adapted to play according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and apparatus to locate a three dimensional object on a surface and to execute a predetermined operation on the located object as described herein below. The embodiments herein achieve a method and apparatus that could reduce the cost associated with the process of manufacturing a computer controlled robot with vision intelligence to play game such as carom. The embodiments herein achieve a computer controlled robot that includes more degrees of freedom to play game such as carom. The embodiments herein achieve a method and apparatus having special calibration and image mapping routines in order to improve accuracy of the computer controlled robot with vision intelligence to play game such as carom.

Referring now to the drawings, and more particularly to FIGS. 1 through 6, where similar reference characters denote corresponding features consistently throughout the figures, there are shown embodiments.

FIG. 1 depicts a typical carom board (100) on which the computer controller robot (200) according to the present invention could be adapted to play. The carom board includes carom board pockets (102), a striker (104), a carom board playing surface (106), white coin (108), black or dark coin (110), visible line marks (112) that are printed on the carom board (100) and XYZ co-ordinate system attached (114) to the carom board (100).

Figure 2:
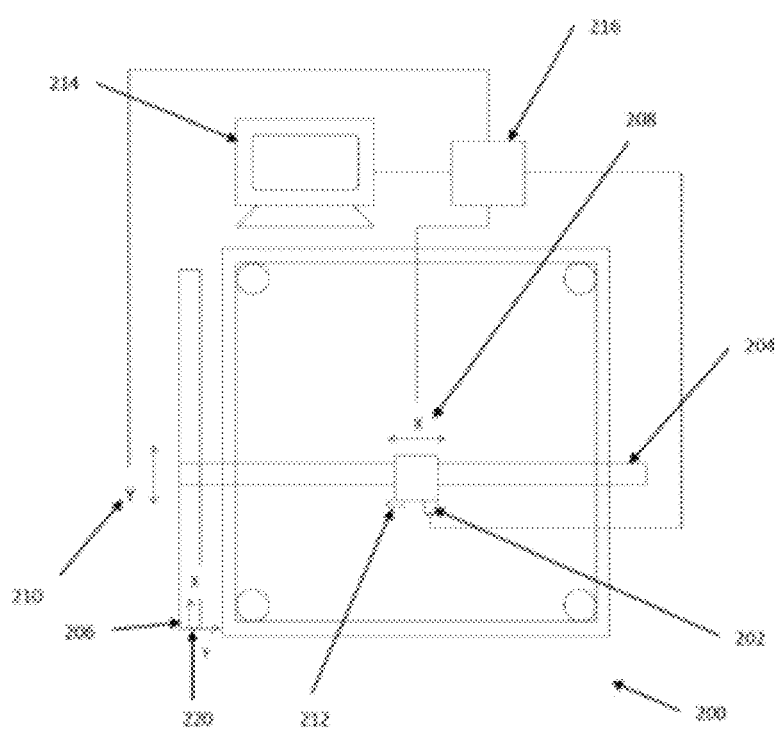
FIG. 2 illustrates a top view of the robot according to an embodiment disclosed herein.
Figure 3A:
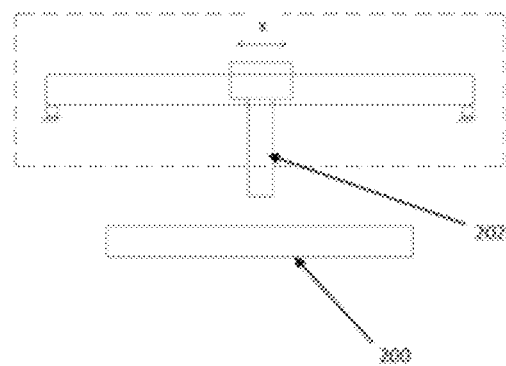
FIGS. 3a and 3b illustrates a front view and side view of the robot respectively according to an embodiment disclosed herein.
Figure 3B:
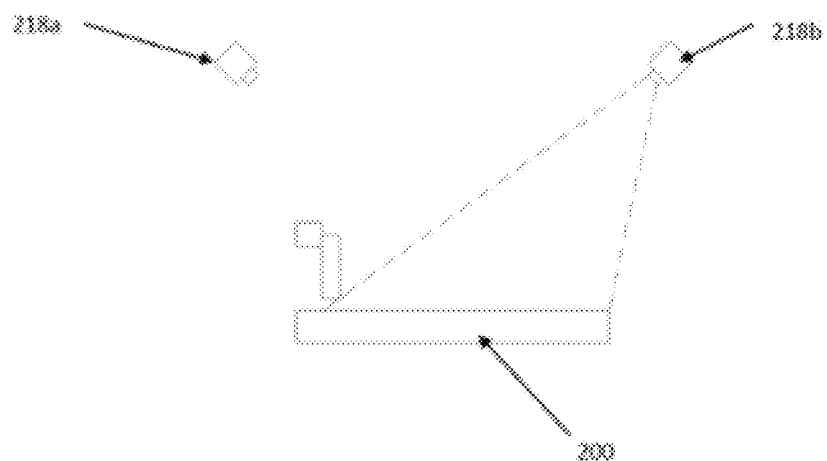

FIG. 2 depicts a schematic view of the robot (200) attached to the carom board (100) according to an embodiment of the present invention. The robot (200) includes an end effecter (202), a gantry X axis frame (204), a gantry Y axis frame (206), a gantry X axis (208), a gantry Y axis (210), a plurality of imaging sensors, a data processing system (computer) (214), a CNC controller (216). The plurality of imaging sensor further includes a local camera (212) and at least one of global camera (218a and 218b) and a XYZ co-ordinate system (220) attached to the robot (200). The CNC controller (216) is configured to regulate functioning of the robot (200) based on the commands received from computer (214). Further, in an embodiment, XYZ axis of the robot (200) is driven by at least one of open loop stepper motors or closed loop servo motors. However, it is also within the scope of invention that the XYZ axis of the robot (200) could be driven by any other motors or combination of different mechanisms that are conventionally used for enabling movements, without otherwise deterring intended function of the robot (200) as can be deduced from this description. FIGS. 2, 3a and 3b illustrate a top view, front view and side view respectively of the robot according to an embodiment of the present invention.

In another embodiment of the invention, the local camera can be mounted on an independent gantry XY robot, located above the robot (200), so that the end-effect or need not have to hover physically over the object to be located.

The description herein below explains various methods (such as calibration techniques, algorithm and so on), and an apparatus (hardware elements that are used in the apparatus which includes but are not limited to robot degree of freedom, end-effecter degree of freedom and configuration, positioning strategies of global camera system (218a and 218b) and local camera system (212) in order to achieve desired position detection accuracies and so on used in this invention.

In an embodiment, the carom board (100) is rigidly clamped to a base table, which is also the base table for the robot (200). In an embodiment, carom board (100) and robot (200) could be individually mounted on to separate base tables. Further, carom board (100) and robot (200) are mounted to a base table such that the XYZ co-ordinate system attached (114) to the carom board (100) is parallel to the XYZ co-ordinate system (220) attached to the robot (200). In an embodiment, any kind of misalignment between XYZ co-ordinate system (114) attached to the carom board (100) and the XYZ co-ordinate system (220) attached to the robot (200) is adjusted by suitable calibration techniques.

At least one of global camera (218a and 218b) is mounted rigidly on to the base table at a convenient viewing angle such that most part of carom board playing surface (106) is captured by at least one of global camera (218a and 218b). In an embodiment, the convenient viewing angle for global camera (218a and 218b) is 45 degrees. However, it is also within the scope of invention, that the global camera could be placed in any desired convenient viewing angle without otherwise deterring intended function of the global camera (218a and 218b) and robot (200) as can be deduced from this description.

Figures 4A, 4B:
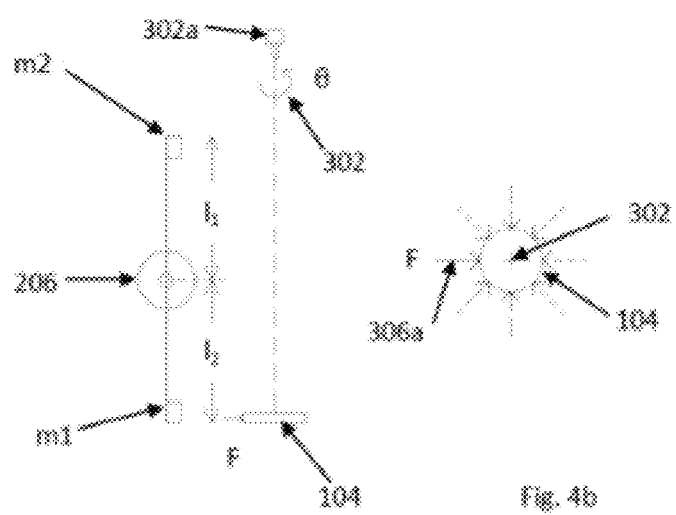
FIGS. 4a and 4b illustrates end-effect or schemes of the robot according to an embodiment disclosed herein.

In one embodiment FIG. 4a and FIG. 4b depicts the degrees of freedom provided to the end effect or. The end effecter (202) is mounted on to the robot (200). The first degree of freedom (302) of the end effecter (202) is a rotational axis. Further, the second degree of freedom (304) of the end effecter (202), includes an actuator (306) mounted on the first degree of freedom (302) for transmitting force of end effect or (202). In an embodiment, the actuator (306) is rigidly mounted on the first degree of freedom (302) such that the direction of actuating force (306a) is always passing through and intersecting the rotational axis of the first degree of freedom (302). Further, the direction of actuating force (306a) is acting inwards, pointing towards the rotational axis of the first degree of freedom (302). In an embodiment, the actuator (306) that is configured to generate striking force (306a) is selected from a DC voltage controlled device such as DC motor or solenoid. However, it is also within the scope of invention, that the actuator (306) could be selected from any other devices or mechanism that are configured to generate striking force (306a) without otherwise deterring the intended function of the actuator 20 (306) and the end effecter (202) as can be deduced from this description. The striking force (306a) of the actuator is controlled by means of Pulse Width Modulation (PWM) control of the DC voltage applied to the actuator (306a). In an embodiment, the PWM signal is generated by the CNC controller (216).

In an embodiment, the end effecter (202) is designed such that, when striker (104) is below the rotational axis (302), the actuating force (306a) is imparted on to the periphery of the striker (104). In an embodiment, the actuating force (306a) is imparted on to the periphery of the striker (104), pointing towards the centre of the striker (104) and also parallel to the carom board playing surface (106). In an embodiment, positioning of rotating axis (302) is controlled by at least one of actuator (302a). The CNC controller (216) is configured to regulate functioning of the actuator (302a). The angular position of rotating axis (302) determines the direction of striking force (306a). In another embodiment, the actuator (302a) could be selected from the similar configuration and controlled by similar mechanism as explained with respect to actuator (306).

In an embodiment, the actuator (306) is a geared DC motor. A mechanical link is attached to the DC motor shaft, such that the center of the link is offset from the mounting point of the link to the motor shaft. This results in link length L1 and L2 as depicted in FIG. 4a. Inertial Masses m1 and m2 are attached at the two end of the link such that they balance each other dynamically during rotation of the actuator (306). This unequal length also ensures that only mass m1 will hit the striker (104) and mass m2 will never come in contact with the striker (104) on the carom board (100). In another embodiment, the proposed end-effecter (202) involves 10 simple two degrees of freedom, which allows execution of all possible shots allowed in a carom board (100). The embodiment of enabling the striking force in end effecter (202) by rotary motion actuators, carrying counter balanced inertial masses has several advantages over a push system end effect or like a solenoid or a linear actuator. The counter-balanced inertial masses based rotary system of imparting force results in minimal inertial forces on the system at the time of impacting the striker. Also the rotary system is able to accelerate over three quadrants of a circle before impacting the striker. This results in a very compact end-effecter system capable of playing shots even if the striker (104) is close to the walls of the playing board's surface (106).

The local camera (212) is mounted on to the robot (200), such that the local camera (212) is looking down on the carom board playing surface (106) and the camera's (212) image plane is parallel to the carom board playing surface (106). Further, the local camera (212) is mounted at a fixed offset dX and dY from the end effecter's rotational axis (302). In an embodiment, the offset distance dX and dY is precisely measured by suitable calibration techniques that are explained herein below. The calibration techniques are performed on various elements of the robot (200) in order to improve accuracy of robot (200).

It should be noted that the aforementioned configuration of robot (200) and carom board (100) is provided for the ease of understanding of the embodiments of the invention. However, certain embodiments may have a different configuration of the components of the robot (200) and carom board (100) and certain other embodiments may exclude certain components of the robot (200) and carom board (100). Therefore, such embodiments and any modification by addition or exclusion of certain components of the robot (200) and carom board (100) without otherwise deterring the intended function of the robot (200) as is apparent from this description and drawings are also within the scope of this invention.

Calibration techniques with respect to Global camera (218a and 218b) utilize the visible line marks (112) that are printed on the carom board (100). The location of visible line marks (112) with respect to the XYZ co-ordinate system (114) attached to the carom board (100) is known already. The visible line marks (112) includes four line and circle marks (design pattern) printed on the four corners of the carom board (100). These four line marks are captured by at least one of global camera (218a and 218b). Further, each of the line marks includes a pixel co ordinate on this image. The four line marks form a perfect rectangle on the board (100) with respect to the XYZ co-ordinate system (114). However, in the images pixel co ordinate, the four line marks form a quadrilateral. Projective image mapping technique is used to map the pixel co ordinate to the XYZ co-ordinate system (114) using the visible line marks (112) as the reference.

The steps for measuring the actual offset are explained herein below. The steps for measuring the actual offset involve providing a sheet of paper below the end effecter assembly (202). First the location (401) of the local camera in the XYZ co-ordinate system (220) is recorded. Then a first mark (404a) is recorded in the paper using the marker pen or red dot laser (402). Further, the end effecter (202) is moved to a second position by lifting the marker (402) up and rotating the end effecter (202) by 90 degrees. In this second position, a second mark (404b) of XYZ co-ordinate system (220) is obtained. Further, the end effecter (202) is moved to a third position by lifting the marker (402) up and rotating the end effecter (202) by 90 degrees. In this third position, a third mark (404c) of XYZ co-ordinate system (220) is obtained. The three marks (402a, 402b and 402c) made on the paper, lies on a circle, whose center XY co-ordinate (406) will be the exact XY co-ordinate of the location of the rotational axis (202). The local camera (212) is used in a Co-ordinate Measuring Machine (CMM) mode to find the three marked points (402a, 402b and 402c) and then the center XY co-ordinate (406). The offset between the XY co-ordinate (401) and the XY co-ordinate (406) could be estimated as dX and dY offset between the local camera (212) and the rotational axis (302) of the end effecter (202). Further, the local camera (212) is configured to determine the angle between the XYZ coordinate system attached (114) to the carom board (100) and XYZ co-ordinate system (220) 15 attached to the robot (200) thereby enabling calibration technique with respect to XYZ co ordinate system (114) and (220). In another embodiment, the local camera is configured to determine the angle between the co-ordinate system of the local camera (212) and XYZ coordinate system (220) attached to the robot (200) thereby enabling calibration technique with respect to XYZ co-ordinate system (220) and local camera (212).

Figure 5A:
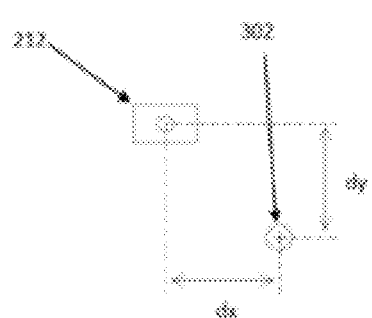
FIGS. 5a, 5b and 5c illustrates calibration techniques used in the robot according to an embodiment disclosed herein.
Figure 5B:
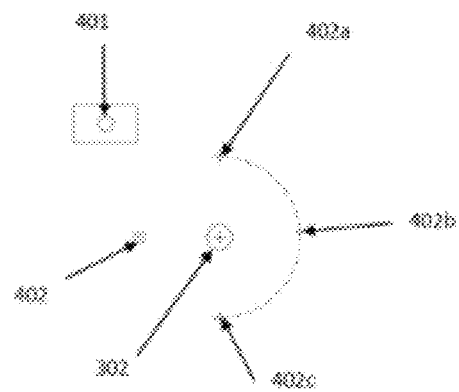
Figure 5C:
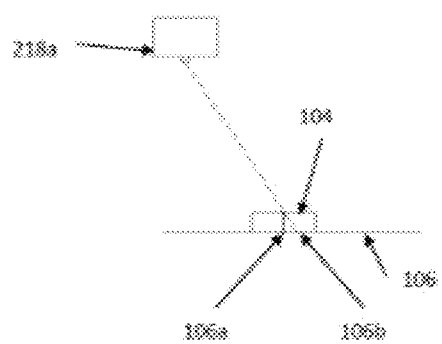

FIGS. 5a and 5b illustrates calibration techniques used in the robot according to an embodiment of the present invention. A method for providing a Carom Playing Robot includes performing the calibration tasks as explained in the description. Further, at least one of the global camera (218a and 218b) is configured to capture image of the carom board (100) position. The computer (214) is configured to receive information from at least one of global camera (218a and 218b) and 25 computes the approximate coin position (white coin 108, black or dark coin 110) on the board (100) with respect to the XYZ co-ordinate system attached (114) to the carom board (100). Further, the computer (114) is configured to make decisions about at least one of coin to strike, angle to strike, force to strike, striker position and so on based on the computed coin positions. Among all the coins (white coin 108, black or dark coin 110) on the board (100), list of coins 30 that are relevant to this particular selected shot is chosen. Further, the local camera is used in CMM mode and those coin positions are computed more accurately by the local camera (212). The CNC controller (216) regulates functioning of the robot (200), to move the rotational axis (302) of the end effecter (202) to the determined striker position. In one embodiment, the striker (104) is manually placed near the rotational axis (302) of the end effecter (202). In another embodiment, the striker (104) is automatically carried by the end-effect or and placed near the rotational axis (302) of the end effecter (202). In both cases, due to the action of gripping and releasing the striker (104), the striker (104) may not be at the exact intended point, say the exact intended point is xyzSP. Further, the actual location of the striker after placing is xyzSP1. The exact XYZ co-ordinate system (220) is computed by the local camera (212) again in CMM mode. Further, the rotational axis (302) of the end effecter (202) is placed exactly at the point xyzSP1 of XYZ co-ordinate system (220) by the gantry robot (200). Furthermore, the end effecter actuators (302*a*) and (306) are used to position the end effecter (202) at the computed angle and to strike the striker with the appropriate force respectively thereby enabling accurate shot by the robot (200). In one embodiment the end effect or mounted on a Cartesian robotic gantry frame with two degrees of freedom X & Y (and optionally Z) combined with the end effect or configuration, provides totally a four degrees of freedom to the apparatus.

Figure 6A:
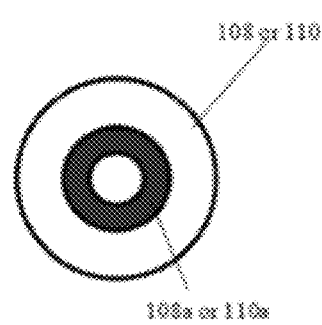
FIG. 6a depicts an artificial pattern mark created on the coins according to an embodiment of the present invention.
Figure 6B:
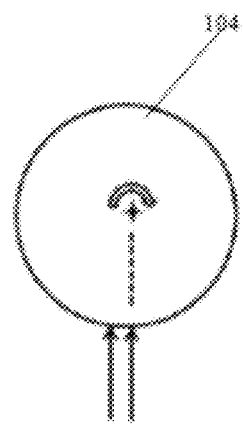
FIGS. 6b and 6c depicts point of impact on the striker in order to achieve sliding spin and rolling spin action respectively on the striker according to an embodiment of the present invention.
Figure 6C:
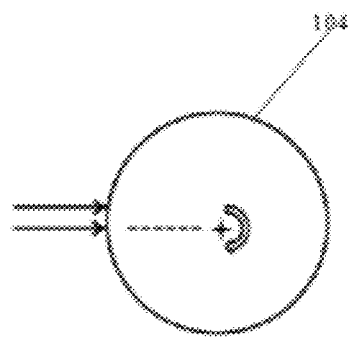

In another embodiment, the point of impact of the end-effect or (202) on the striker (104) is varied in order to achieve sliding or rolling spin action on the striker object (104). This can be achieved with the proposed two degree of freedom (302 and 304) of end effect or (202) itself by varying the xyz location of the end-effect or (202) without need for extra degree of freedom such as pitch, roll and so on. FIGS. 6*b* and 6*c* depicts point of impact on the striker in order to achieve sliding spin and rolling spin action respectively on the striker according to an embodiment of the present invention.

In an embodiment, an artificial pattern mark (108*a* or 110*a*) is created on the coins (108 or 110) thereby making it easier for the local camera (212) and global cameras (218*a* and 218*b*) to locate the coin (108 or 110) positions. FIG. 6*a* depicts an artificial pattern mark created on the coins according to an embodiment of the present invention. In this invention, it is proposed to make artificial patterns on a 3D object, such that the pattern contains at least one pattern visible to the camera in one image frame. There are sufficient numbers of such patterns printed all over the object such that irrespective of the object orientation with respect to camera, at least one pattern is sensed by the camera. In one embodiment the above calculations can also be extended for the situation, when the camera's image plane is not parallel to the plane on which the ball is lying.

It should be noted that various actions in the above method for providing a Carom Playing Robot may be performed in the order presented, in a different order or simultaneously. Further, in some embodiments, some actions listed in the method may be omitted. Therefore, such embodiments of the method without otherwise deterring the intended function of the robot (200) as is apparent from this description and drawings are also within the scope of this invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. An apparatus to locate a three dimensional object and to execute a predetermined operation on said located object said apparatus comprising:
    a robot (200) having an end effector (202) mounted on a gantry frame, wherein said effector (202), includes an actuator (306) carrying counter-balanced inertial masses at an un-equal distance for striking the located object with a striking force (306 *a*) achieved by a rotary motion of said actuator (306);
    a plurality of imaging sensors mounted at predetermined positions in said gantry frame;
    a data processing system (214) in communication with said robot (200) and said imaging sensors; and
    a controller (216) connected to said data processing system (214);
    wherein said effector consists of at least two degrees of freedom;
    wherein said two degrees of freedom are rotational (302) and force transmitting (306 *a*);
    wherein said transmitting force passes through and intersects said rotational axis for any angular position of said rotational axis between 0-360 degrees; and
    wherein said controller (216) regulates functions of said data processing system (214).

2. The apparatus as claimed in claim 1, wherein said transmitting force of the end effector (202) acts inward and pointing towards the axis of rotation.

3. The apparatus as claimed in claim 1, wherein said imaging sensors for locating the object position include at least one global camera (218*a* and 218*b*) for approximate position location and a local camera (212) for more accurate position location.

4. The apparatus of claim 3, wherein a laser 402 is attached to the degree of freedom (302) of the end effector (202) and wherein marks (402*a*, 402*b*, 402*c*) are used by the local camera (212) for calibrating X,Y offset distance between the local camera (212) and the rotary axis (302) using circlefit method.

5. The apparatus as claimed in claim 1, wherein the actuator (306) is rigidly mounted on a first degree of freedom (302) of the at least two degrees of freedom for transmitting force (306*a*) to the located object.

6. The apparatus as claimed in claim 1, wherein said actuator (306) is positioned such that an inertial mass impacts the located object at the lower most point of its circular trajectory.

7. The apparatus as claimed in claim 1, wherein said object for location is provided with a predetermined pattern on its surface such that at least three points of the pattern are always visible to the local camera (212) to facilitate the imaging sensor to capture an image and calculate the position of the object.

8. A method for locating a three dimensional object and to execute a predetermined operation on said located object said method comprising:
  providing a robot (200) having an end effector (202) mounted on a gantry frame, wherein said effector (202), includes an actuator (306) carrying counter-balanced inertial masses for striking the located object with a striking force (306 a) achieved by a rotary motion of said actuator (306);
  installing a plurality of imaging sensors at predetermined locations to capture at least one image of said object;
  calibrating each of said plurality of image sensors;
  providing a data processing system (214) to receive information from said imaging sensors and to execute a predetermined operation; and
  connecting a controller (216) to regulate functions of said robot (200);
  wherein said end effector (202) comprises t least two degrees of freedom;
  wherein said two degrees of freedom are rotational (302) and force transmitting (306 a);
  wherein said transmitting force passes through and intersects said rotational axis for any angular position of said rotational axis between 0-360 degrees; and
  wherein said controller (216) regulates functions of said data processing system (214).

9. The method as claimed in claim 8 wherein calibrating each of said plurality of image sensors comprises:
  providing a predetermined pattern on a surface and on an object for location;
    locating patterns with respect to a XYZ co-ordinate system attached to a surface;
    mapping a pixel coordinate to the XYZ co-ordinate system using the predetermined pattern as a reference for projective mapping; and
    locating the object for executing a predetermined operation.

10. The method as claimed in claim 8, wherein the degree of freedom (302) of the end effector (202) is positioned on top of the center of the located object prior to executing the shot.

* * * * *